United States Patent [19]
Mizzoni et al.

[11] 3,718,654
[45] Feb. 27, 1973

[54] ANILINO-3-PYRIDINESULFONIC ACIDS

[75] Inventors: Renat Herbert Mizzoni, Long Valley R. D.; Herbert Morton Blatter, Summit, both of N.J.

[73] Assignee: Ciba-Geigy Corporation, Ardsley, N.Y.

[22] Filed: Nov. 12, 1970

[21] Appl. No.: 89,021

Related U.S. Application Data

[63] Continuation-in-part of Ser. No. 24,869, April 1, 1970, Pat. No. 3,671,512.

[52] U.S. Cl....260/294.8 R, 260/240 J, 260/294.8 F, 424/263, 424/266
[51] Int. Cl. ............................................. C07d 31/48
[58] Field of Search .................. 260/294.8 R, 294.8 F

[56] References Cited

UNITED STATES PATENTS 3,674,794   7/1972   Mizzoni et al..................260/294.8 F Primary Examiner—Alan L. Rotman
Attorney—Harry Goldsmith, Joseph G. Kolodny and Mario A. Monaco

[57] ABSTRACT

New ortho-anilino-3-pyridinesulfonic acids, e.g., those of the formula

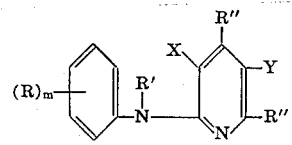

$R$=H, alkyl, free, esterified or etherified OH, $CF_3$, $NO_2$, amino, free or functionally converted carboxy or sulfo
$R'$=H, alkyl or acyl
$R''$=H or alkyl, m=1-3
one of X and Y=H or alkyl, other is $SO_3H$ the N-oxide and functional derivatives thereof, are diuretic and antiinflammatory agents.

4 Claims, No Drawings

ANILINO-3-PYRIDINESULFONIC ACIDS

CROSS-REFERENCES TO RELATED APPLICATIONS

This is a continuation-in-part of application Ser. No. 24,869, filed Apr. 1, 1970, now U.S. Pat. No. 3,671,512 dated June 30, 1972.

SUMMARY OF THE INVENTION

The present invention concerns and has for its object the provision of new ortho-anilino-3-pyridinesulfonic acids and pharmaceutically useful functional acid or amino derivatives thereof, preferably of those corresponding to Formula I

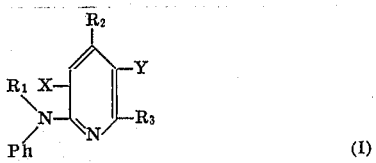

(I)

wherein Ph is a phenyl radical, $R_1$ is hydrogen, lower alkyl or an acyl radical, each of $R_2$ and $R_3$ is hydrogen or lower alkyl and one of X and Y is hydrogen or lower alkyl and the other is sulfo, of the N-oxide and pharmaceutically useful functional acid or amino derivatives thereof, as well as of corresponding pharmaceutical compositions and of methods for the preparation and application of these products. Said products of the invention are primarily useful as diuretic, natri- and chloriuretic agents in order to relieve mammals from excessive water and/or salt retention.

DESCRIPTION OF THE PREFERRED EMBODIMENTS

The phenyl radical Ph is unsubstituted or substituted by one or more than one, preferably by up to three, advantageously one or two, of the same or different substituents selected from the group consisting of lower alkyl, e.g., methyl, ethyl, n- or i-propyl or -butyl; free, etherified or esterified hydroxy or mercapto, such as lower alkoxy or lower alkylmercapto, e.g., methoxy, ethoxy, n- or i-propoxy or -butoxy, methylmercapto or ethylmercapto, lower alkanoyloxy, e.g., acetoxy or propionyloxy, halogeno, e.g., fluoro, chloro or bromo; trifluoromethyl, nitro, amino, mono- or di-lower alkylamino or lower alkyleneimino, e.g., mono- or dimethylamino or -ethylamino, pyrrolidino or piperidino; free, esterified or amidated carboxy or sulfo, e.g., lower carbalkoxy or alkoxysulfonyl, carbamoyl, sulfamoyl, mono- or di-lower alkylcarbamoyl or -sulfamoyl, e.g., carbomethoxy, carbethoxy, methoxysulfonyl, mono- or dimethyl-carbamoyl or -sulfamoyl. The term "lower," referred to above and hereinafter in connection with organic radicals or compounds respectively, defines such with up to seven, preferably up to four, carbon atoms.

Preferred Ph radicals are phenyl, mono- or di-(lower alkyl)-phenyl, mono-, di- or tri-(lower alkoxy)-phenyl, mono- or di-(halo)-phenyl, (halo, lower alkyl)-phenyl, (halo, trifluoromethyl)-phenyl, mono- or bis-(trifluoromethyl)-phenyl, (di-lower alkylamino)-phenyl, (carboxy)-phenyl, (lower carbalkoxy)-phenyl or (sulfamoyl)-phenyl.

The alkyl radical $R_1$, $R_2$ and $R_3$ are preferably such with up to four carbon atoms, e.g., those mentioned above, especially methyl.

An acyl radical $R_1$ is preferably lower alkanoyl or alkenoyl, e.g., acetyl, propionyl, pivaloyl, acryloyl or methacryloyl, or Ph-lower alkanoyl or -alkenoyl, e.g., benzoyl, phenylacetyl or cinnamoyl.

Functional derivatives of the acids of Formula I are preferably pharmaceutically acceptable esters, amides, hydrazides or salts thereof. Esters are, for example, lower alkyl or (hydroxy, lower alkoxy, amino or Ph)-lower alkyl esters, e.g., the methyl, ethyl, n- or i-propyl, 2-(hydroxy, methoxy, amino or dimethylamino)-ethyl or benzyl esters. The amides or hydrazides of said acids are N-unsubstituted or N-substituted, preferably by one or more than one lower alkyl, e.g., methyl or ethyl, group or a lower alkylene, e.g., 1,4-butylene or 1,5-pentylene, group. Salts of said acids, primary or secondary amides or hydrazides, are preferably those of therapeutically useful inorganic or organic bases, primarily the alkali metal, or alkaline earth metal, e.g., sodium, potassium, magnesium or calcium salts, or ammonium salts respectively, derived from ammonia or amines, such as those of mono-, di- or tri-lower alkylamines, or tertiary nitrogen bases, such as pyridine, collidine or lutidine. Resulting compounds that contain basic groups, e.g., amino groups, may also form acid addition salts, preferably such of therapeutically useful inorganic or organic acids, such as strong metalloidic acids, for example hydrohalic acids, e.g., hydrochloric or hydrobromic acid; sulfuric, phosphoric, nitric or perchloric acid; aliphatic or aromatic carboxylic or sulfonic acids, e.g., formic, acetic, propionic, succinic, glycollic, lactic, malic, tartaric, citric, ascorbic, maleic, hydroxymaleic, pyroracemic, phenlacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, napthalenesulfonic or sulfanilic acid; methionine, tryptophane, lysine or arginine.

The compounds of the invention exhibit valuable pharmacological properties. Besides antiinflammatory effects, they primarily show diuretic, natri- and chloriuretic activity with rapid onset of action, high urine but low potassium excretion levels. This can be demonstrated in animal tests using, for example mammals, e.g., rats or dogs, as test objects. The compounds of the invention can be administered enterally or parenterally, for example orally within a gelatin capsule to dogs, or in the form of aqueous solutions or suspensions by stomach tube to rats. The oral dosage may range between about 0.1 and 100 mg/kg/day, preferably between about 0.5 and 50 mg/kg/day, advantageously between about 1 and 25 mg/kg/day. Simultaneously the test animals may receive various salt loads enterally or parenterally, for example, various amounts of subcutaneously applied 0.9 percent saline, e.g., 100 ml thereof per medium-sized dog (beagle). Thus, the compounds of the invention cause an increase in the excretion of urine, which is collected, e.g., at 2 hour intervals, with or without catheterization, and its volume, sodium, potassium and chloride content estimated and compared with that of the same untreated or saline-treated animals. Said compounds, predominantly the amides or hydrazides, also cause in the rat paw edema test [Winter et al., Proc. Soc. Exp. Biol. Med. 111, 544 (1962)] a slight reduction of the paw edema induced by carrageenin. Accordingly, the compounds of the invention are mild antiphlogistics and potent diuretics, sodi- and chloriuretics, primarily useful in the treatment or management of edematous water and salt retention, usually in connection with heart and kidney diseases or hypertension. They can also be used as intermediates in the preparation of other valuable products, primarily of pharmacologically active compounds.

Particularly useful are those compounds of Formula I in which Ph is phenyl or phenyl substituted by up to three of the same or different substituents selected from the group consisting of lower alkyl, hydroxy, mercapto, lower alkoxy, lower alkylmercapto, lower alkanoyloxy, halogeno, trifluoromethyl, nitro, amino, mono- or di-lower alkylamino, lower alkyleneimino, carboxy, sulfo, lower carbalkoxy, lower alkoxysulfamoyl, carbamoyl, sulfamoyl, mono-or di-lower alkylcarbamoyl, mono- or di-lower alkylsulfamoyl, $R_1$ is hydrogen, lower alkyl, lower alkanoyl, lower alkenoyl, PH-lower alkanoyl or Ph-lower alkenoyl, each of $R_2$ and $R_3$ is hydrogen or lower alkyl, and one of X and Y is hydrogen or lower alkyl and the other is sulfo, or the N-oxide, a lower alkyl or (hydroxy, lower alkoxy, amino or Ph)-lower alkyl ester, the amide or hydrazide, a mono- or di-lower alkylamide, lower alkyleneamide, mono-, di- or tri-lower alkylhydrazide, an alkali metal, alkaline earth metal or ammonium salt, or a therapeutically useful acid addition salt thereof.

Preferred are those compounds of Formula I in which Ph is phenyl, mono- or di-(lower alkyl)-phenyl, mono-, di- or tri- (lower alkoxy)-phenyl, mono- or di- (halo)-phenyl, (halo-lower alkyl)-phenyl, (halo, trifluoromethyl)-phenyl, mono- or bis- (trifluoromethyl)-phenyl, (di-lower alkylamino)-phenyl, (carboxy)-phenyl, (lower carbalkoxy)-phenyl or (sulfamoyl)-phenyl, $R_1$ is hydrogen, lower alkyl or alkanoyl and each $R_2$ and $R_3$ is hydrogen or lower alkyl, and one of X and Y is hydrogen or lower alkyl and the other is sulfo, or a lower alkyl ester, the amide, a mono- or di-lower alkylamide, a five to seven ring-membered lower alkyleneamide, the ammonium, and alkali or alkaline earth metal salt thereof.

Especially valuable are the compounds of Formula I in which Ph is phenyl, mono- or dimethylphenyl, mono- , di- or trimethoxyphenyl, mono- or dichlorophenyl, (chloro, methyl)-phenyl, (chloro, trifluoromethyl)-phenyl, mono- or bis- trifluoromethylphenyl, dimethylaminophenyl, carboxyphenyl, carbethoxyphenyl or sulfamoylphenyl, each of $R_1$, $R_2$ and $R_3$ is hydrogen or methyl and one of X and Y is hydrogen or methyl and the other is sulfo, the amide, mono- or dimethylamide, sodium or potassium salt thereof.

Outstanding are the compounds of Formula I in which Ph is phenyl, mono- or dimethyl phenyl, fluorophenyl, chlorophenyl, bromophenyl or trifluoromethylphenyl, each of $R_1$, $R_2$ and $R_3$ is hydrogen, and one of X and Y is hydrogen and the other is sulfo, or the amide, sodium or potassium salt thereof.

The compounds of the invention are either prepared according to known methods or, more advantageously, according to a new method which is also a part of the present invention. For example, they are obtained by converting in a compound of the Formula II

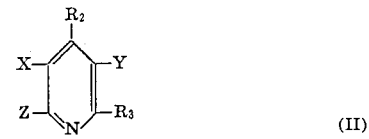

(II)

in which Z is a group capable of being converted into the amino group $R_1$-N-Ph, or in a functional derivative thereof, X into said amino group and, if desired, converting any resulting compound into another compound of the invention.

The group Z is, for example, a free or preferably reactively etherified or esterified hydroxy group, such as lower alkoxy, lower alkanoyloxy or halogeno, e.g., such mentioned above, advantageously methoxy or chlorine, or a nitro group. Functional derivatives of the acid of Formula II are, for example the abovementioned esters or the unsubstituted or substituted amides, hydrazides or salts.

The above-mentioned starting material, especially when Z is a nitro group (constituting the novel feature of the present process) is advantageously reacted with the amine $R_4$-NH-Ph, wherein $R_4$ is hydrogen or lower alkyl, preferably in the absence, but also in the presence of diluents, advantageously of those which are inert to the reagents and are solvents thereof, of catalysts, condensing agents and/or inert atmospheres, at low temperatures, room temperature or elevated temperatures, for example, between about 0° and 150°, or preferably between about 20° and 130°, at atmospheric or superatmospheric pressure.

In the above reaction the amine reagent is advantageously used in excess, at least 100 percent, in order to neutralize any generated acid. It may, however, also be used in equivalent amounts and in the presence of other condensing agents such as inorganic or organic bases, e.g., alkali metal carbonates or bicarbonates or tertiary nitrogen bases, for example tri-lower alkylamines, N,N-dimethylaniline or pyridine.

The compounds of the invention so obtained can be converted into each other according to known methods. For example, any resulting compound in which $R_1$ stands for hydrogen, may be reacted with a reactive ester of a corresponding alcohol, for example that of a hydrohalic or sulfonic acid or with a reactive functional derivative of a corresponding acid, such as a halide or anhydride thereof, e.g., acetyl chloride or acetic anhydride. Resulting acyl derivatives or esters may be hydrolyzed, for example with the use of acidic or alkaline hydrolyzing agents, esters transesterified or resulting acids esterified in known manner, i.e., either directly with the use of lower alkanols and acidic catalysts, or indirectly via the acid halides, which latter can be prepared with the use of thionyl or phosphorus halides, e.g., thionyl chloride or phosphorus pentachloride. Said acid halides can also be reacted with ammonia, hydrazine, primary or secondary amines or hydrazines in order to obtain the corresponding amides or hydrazides. Any resulting amide or hydrazine can also be hydrolyzed in the usual manner, for example, with the use of a base, e.g., an aqueous alkali or alkaline earth metal hydroxide, or a quaternary ammonium hydroxide. Resulting acids can also be salified in the usual manner, i.e., by reaction with corresponding inorganic or organic bases, e.g., alkali metal or alkaline earth metal hydroxides, carbonates or bicarbonates, ammonia, amines or corresponding ion exchange preparations. Resulting bases may also be converted into acid addition salts by reacting them with the corresponding free acids, e.g., those mentioned above, or acidic ion exchange preparations.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this contest, a corresponding salt is also intended, provided such is possible or appropriate under the circumstances. Resulting mixtures of isomers can be separated into the single isomers by methods in themselves known, e.g., by fractional distillation crystallization and/or chromatography.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly those starting materials should be used in the reactions of the invention that lead to the formation of those compounds indicated above as being especially valuable.

The starting material is known or, if new, may be prepared according to methods illustrated in the examples herein. They are prepared from the corresponding ortho-amino-3-pyridinesulfonic acids or their functional derivatives, either by diazotization and hydrolysis of the diazonium salt, to yield the orthohydroxy-3-pyridinesulfonic acids, or by oxidation, preferably with the use of peroxides, such as hydrogen peroxide or advantageously persulfuric acid, to yield the ortho-nitro-3-pyridinesulfonic acids. Said ortho-hydroxy compounds may then be converted into reactive esters or ethers thereof, e.g., by reacting them with reactive acid derivatives such as phosphorus oxychloride or pentachloride or lower alkanoyl halides, or alkoholyzing said esters, especially the halides, with lower alkanols respectively.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with a) diluents, e.g., lactose, dextrose, sucrose, mennitol, sorbitol, cellulose and/or glycine, b) lubricants, e.g., silica, talcum, stearic acid, its magnesium or calcium salt and/or polyethyleneglycol, for tablets also c) binders, e.g., magnesium aluminum silicate, starch paste, gelatin, tragacanth, methylcellulose, sodium carboxymethylcellulose and /or polyvinyl-pyrrolidone, if desired, d) disintegrants, e.g., starches, agar, alginic acid or its sodium salt, enzymes of the binders or effervescent mixtures and/or e) absorbents, colorants, flavors and sweeteners. Injectable compositions are preferably aqueous isotonic solutions or suspensions, and suppositories are advantageously fatty emulsions or suspensions. They may be sterilized and/or contain adjuvants; such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75 percent, preferably about 1 to 50 percent of the active ingredient.

The following examples illustrating the invention are not to be construed as being limitations thereon. Temperatures are given in degrees Centigrade and all parts wherever given are parts by weight.

EXAMPLE 1

The mixture of 1.3g of 2-chloro-3-pyridinesulfonic acid and 8ml of 3-chloroaniline is heated slowly to 120° while stirring. After 4 hours it is cooled in an ice bath, diluted with diethyl ether and the precipitate formed filtered off. It is washed with diethyl ether and water, taken up in warm water and the mixture adjusted with 10 percent aqueous sodium carbonate to pH=8. It is washed with methylene chloride, treated with charcoal, filtered and evaporated under reduced pressure. The residue is taken up in isopropanol, the mixture evaporated, the residue again taken up in methanol, the solution filtered and the filtrate again evaporated, to yield the sodium 2-(3-chlorophenylamino)-3-pyridinesulfonate monohydrate of the formula

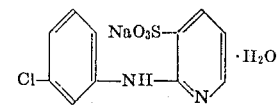

melting at 252°–253°.

EXAMPLE 2

The mixture of 9.5g of 6-chloro-3-pyridinesulfonic acid and 55ml 3-trifluoromethylaniline is stirred for 8 hours at 150°, cooled to room temperature and filtered. The filtrate is diluted with diethyl ether, the yellow oil formed separated, triturated with diethyl ether and recrystallized from isopropanol, to yield the 6-(3-trifluoromethyl-phenylamino)-3-pyridinesulfonic acid of the formula

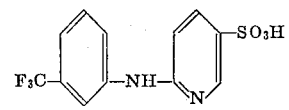

melting at 257°–258° with decomposition.

It is converted into its sodium salt as shown in Example 1, which has an $R_{cm}$=6.0 on silica gel in chloroform-methanol-diethylamine (8:2:1).

EXAMPLE 3

The mixture of 3.75 g of 6-chloro-3-pyridinesulfonamide and 38 ml of 3-trifluoromethylaniline is stirred for 12 hours at 150° under nitrogen. After cooling, it is filtered and the residue recrystallized from ethanol-hexane, to yield the 6-(3-trifluoro-methyl-phenylamino)-3-pyridinesulfonamide of the formula

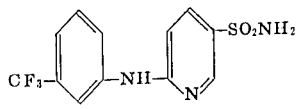

melting at 176°–178°.

EXAMPLE 4

THe mixture of 8.5 g of 6-chloro-5-methyl-3-pyridinesulfonamide and 30 ml of 3-trifluoromethylaniline is stirred under nitrogen for 18 hours at 130° and 4 hours at 160°. After cooling, the mixture is diluted with diethyl ether, filtered and the residue recrystallized from ethanol-hexane, to yield the 5-methyl-6-(C3-tri-fluoromethylphenylamino)-3-pyridinesulfonamide of the formula

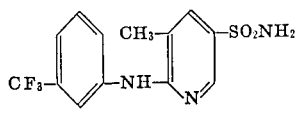

melting at 111°–112°.

The starting material is prepared as follows: To the suspension of 23.5 g of 6-amino-5-methyl-3-pyridinesulfonic acid in 375 ml of 5 percent sulfuric acid, 15 g sodium nitrite are added during 45 minutes while stirring at 25°–35°. The resulting solution is slowly heated to 50°–60° and stirred for ½ hour. After cooling, the pH thereof is adjusted to 6.8 with sodium bicarbonate and the mixture evaporated under reduced pressure. The residue is taken up in hot dimethylformamide, the solution filtered, the filtrate concentrated under reduced pressure and the concentrate diluted with diethyl ether. The precipitate formed is filtered off, washed with diethyl ether and dissolved in hot 95 percent aqueous ethanol. The solution is filtered, the filtrate evaporated and the residue recrystallized from dimethylsulfoxide-isopropanol and ethanol, to yield the sodium 6-hydroxy-5-methyl-3-pyridinesulfonate melting above 300°.

The mixture of 33.7 g thereof, 56.5 g of phosphorus pentachloride and 35 ml of phosphorus oxychloride is refluxed for 16 hours while stirring. After cooling, the mixture is poured onto ice, the precipitate formed after ½ hour filtered off, washed with water, dried and sublimited under reduced pressure, to yield the 6-chloro-5-methyl-3-pyridinesulfonyl chloride melting at 56°–57.

To the solution of 11.3 g thereof in 100 ml of acetone, the mixture of 20 ml of concentrated aqueous ammonia and 20 ml of acetone is added dropwise during 1 hour while stirring at −30°. After 4 hours the mixture is allowed to warm to room temperature, filtered and the residue washed with acetone. The filtrate is refiltered, evaporated, and the residue recrystallized from isopropanol, to yield the 6-chloro-5-methyl-3-pyridinesulfonamide, melting at 192°–193°.

EXAMPLE 5

The mixture of 4 g of 2-chloro-3-pyridinesulfonamide and 20 ml of 2,3-dimethylaniline is heated under nitrogen to 150° while stirring. After 24 hours it is cooled with ice, filtered, the residue washed with diethyl ether and heated under reduced pressure to remove 1.7 g of 2,3-dimethylanilinium chloride. The residue is washed with hot water and dried to yield the 2-(2,3-dimethylphenylamino)-3-pyridinesulfonamide of the formula

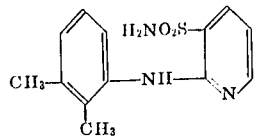

melting at 187°–184°.

EXAMPLE 6

The mixture of 3.87 g of 2-chloro-3-pyridinesulfonamide and 15 ml of 3-trifluoromethylaniline is refluxted under nitrogen for 16 hours while stirring. After cooling it is diluted with diethyl ether, filtered and the residue dissolved in water. The solution is neutralized with 10 percent aqueous sodium carbonate and extracted with diethyl ether. The extract is dried, evaporated and the residue washed with hexane, to yield the 2-(3-trifluoromethylphenylamino)-3-pyridinesulfonamide of the formula

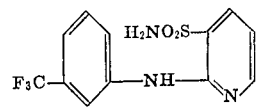

melting at 186°–187°.

It is taken up in the minimum amount of ethanol, the solution made slightly basic with 2N aqueous hydroxide and evaporated after 10 minutes. The residue is taken up in isopropanol, the mixture filtered and the filtrate evaporated, to yield the corresponding sodium salt melting at 232°–233°.

EXAMPLE 7

According to the method described in the previous examples, the following compounds are prepared from equivalent amounts of the corresponding starting materials:

1) 2-or 6-(3-methylphenylamino)-3-pyridinesulfonic acid
2) 2-or 6-(2,3-dimethylphenylamino)-3-pyridinesulfonic acid
3) 2- or 6-(3-methoxyphenlamino)-3-pyridinesulfonic acid
4) 2-or 6-(2-, 3- or 4-fluorophenylamino)-3-pyridinesulfonic acid
5) 2-or 6-(2-, 3- or 4-chlorophenylamino)-3-pyridinesulfonic acid
6) 2-or 6-(3,5-dichlorophenylamino)-3-pyridinesulfonic acid
7) 2-or 6-(2-methyl-3-chlorophenylamino)-3-pyridinesulfonic acid 8) 2-or 6-(N-methyl-N-3-bromophenylamino)-3-pyridinesulfonic acid
9) 2-or 6-(3-carbethoxyphenylamino)-3-pyridinesulfonic acid, their sodium salts or amides.

EXAMPLE 8

Preparation of 10,000 tablets each containing 100.0 mg of the active ingredient:

Formula:
| | |
|---|---|
| sodium 2-(3-chlorophenylamino)-3-pyridinesulfonate monohydrate | 1,000.00 g |
| Lactose | 2,535.00 g |
| Corn starch | 125.00 g |
| Polyethylene glycol 6,000 | 150.00 g |
| Talcum powder | 150.00 g |
| Magnesium stearate | 40.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 65 ml water and the suspension added to the boiling solution of the polyethylene glycol in 260 ml water. The paste formed is added to the powders which are granulated, if necessary, with an additional amount of water. The granulate is dried overnight at 35°, broken on a screen with 1.2 mm openings and compressed into tablets using concave punches with 10.3 mm diameter, uppers bisected.

We claim

1. An ortho-anilino-3-pyridinesulfonic acid of the formula

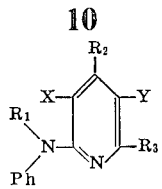

wherein Ph is phenyl, mono- or di-(lower alkyl)-phenyl, mono-, di- or tri-(lower alkoxy)-phenyl, mono- or di-(halo)-phenyl, (halo-lower alkyl)-phenyl, (halo, trifluoromethyl)-phenyl, mono- or bis-(trifluoromethyl)-phenyl, or (di-lower alkylamino)-phenyl, each of $R_1$, $R_2$ and $R_3$ is hydrogen or lower alkyl and one of X and Y is hydrogen or lower alkyl and the other is $SO_3H$, or a lower alkyl ester or pharmaceutically useful ammonium, alkali or alkaline earth metal salt thereof.

2. A compound as claimed in claim 1, in which formula Ph is phenyl, mono- or dimethylphenyl, mono-, di- or trimethoxyphenyl, mono- or dichlorophenyl, (chloro, methyl)-phenyl, (chloro, trifluoromethyl)-phenyl, mono- or bis- trifluoromethylphenyl, dimethylaminophenyl, carboxyphenyl, carbethoxyphenyl or sulfamoylphenyl, each of $R_1$, $R_2$ and $R_3$ is hydrogen or methyl and one of X and Y is hydrogen or methyl and the other is $SO_3H$, $SO_3Na$ or $SO_3K$.

3. A compound as claimed in claim 1, in which formula Ph is phenyl, mono- or dimethyl phenyl, fluorophenyl, chlorophenyl, bromophenyl or trifluoromethylphenyl, each of $R_1$, $R_2$ and $R_3$ is hydrogen, and one of X and Y is hydrogen and the other is $SO_3H$, $SO_3Na$ or $SO_3K$.

4. A compound as claimed in claim 3 and being the 2-(3-chlorophenylamino)-3-pyridinesulfonic acid or the sodium or potassium salt thereof.

* * * * *